(12) United States Patent
Herges et al.

(10) Patent No.: US 9,180,388 B2
(45) Date of Patent: Nov. 10, 2015

(54) FILTER DEVICE FOR FLUIDS

(71) Applicant: Hydac Process Technology GmbH, Neunkirchen (DE)

(72) Inventors: Knut Herges, Spiesen-Elversberg (DE); Ralf Wnuk, Bexbach/Kleinottweiler (DE); Norbert Lang, Blieskastel (DE); Nico Welsch, Mandelbachtal (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 321 days.

(21) Appl. No.: 13/688,349

(22) Filed: Nov. 29, 2012

(65) Prior Publication Data

US 2014/0124430 A1  May 8, 2014

(30) Foreign Application Priority Data

Nov. 2, 2012  (DE) .......................... 10 2012 021 595

(51) Int. Cl.
| | | |
|---|---|---|
| *B01D 27/14* | (2006.01) | |
| *B01D 29/15* | (2006.01) | |
| *B01D 29/52* | (2006.01) | |
| *B01D 29/54* | (2006.01) | |
| *B01D 29/96* | (2006.01) | |

(52) U.S. Cl.
CPC ............... *B01D 27/14* (2013.01); *B01D 29/15* (2013.01); *B01D 29/52* (2013.01); *B01D 29/54* (2013.01); *B01D 29/96* (2013.01); *B01D 2201/0446* (2013.01); *B01D 2201/24* (2013.01); *B01D 2201/291* (2013.01)

(58) Field of Classification Search
None
See application file for complete search history.

(56) References Cited

U.S. PATENT DOCUMENTS

| 2,605,903 | A | * | 8/1952 | Schuller | 210/331 |
|---|---|---|---|---|---|
| 4,242,206 | A | * | 12/1980 | Estabrooke | 210/489 |
| 5,803,941 | A | * | 9/1998 | Berkhoel et al. | 55/498 |
| 5,985,142 | A | * | 11/1999 | Belden | 210/232 |
| 2011/0061353 | A1 | * | 3/2011 | Fischer | 55/498 |

* cited by examiner

*Primary Examiner* — Benjamin Kurtz
(74) *Attorney, Agent, or Firm* — Wenderoth, Lind & Ponack, L.L.P.

(57) ABSTRACT

A filter device for fluids, in particular for low viscosity fluids such as water, includes a filter housing (1) in which element holders (31) are provided for a plurality of filter elements (21). Filter medium (35) of each filter element in the filter housing (1) separates an unfiltered side (5) from a clean side (7). The filter housing (1) can be opened for inserting and removing the filter elements (21). A carrier in the form of a basket (19) is provided for the filter elements (21). The basket can be inserted into and removed from the filter housing (1). The filter elements (21) can be releasably secured at the basket.

11 Claims, 5 Drawing Sheets

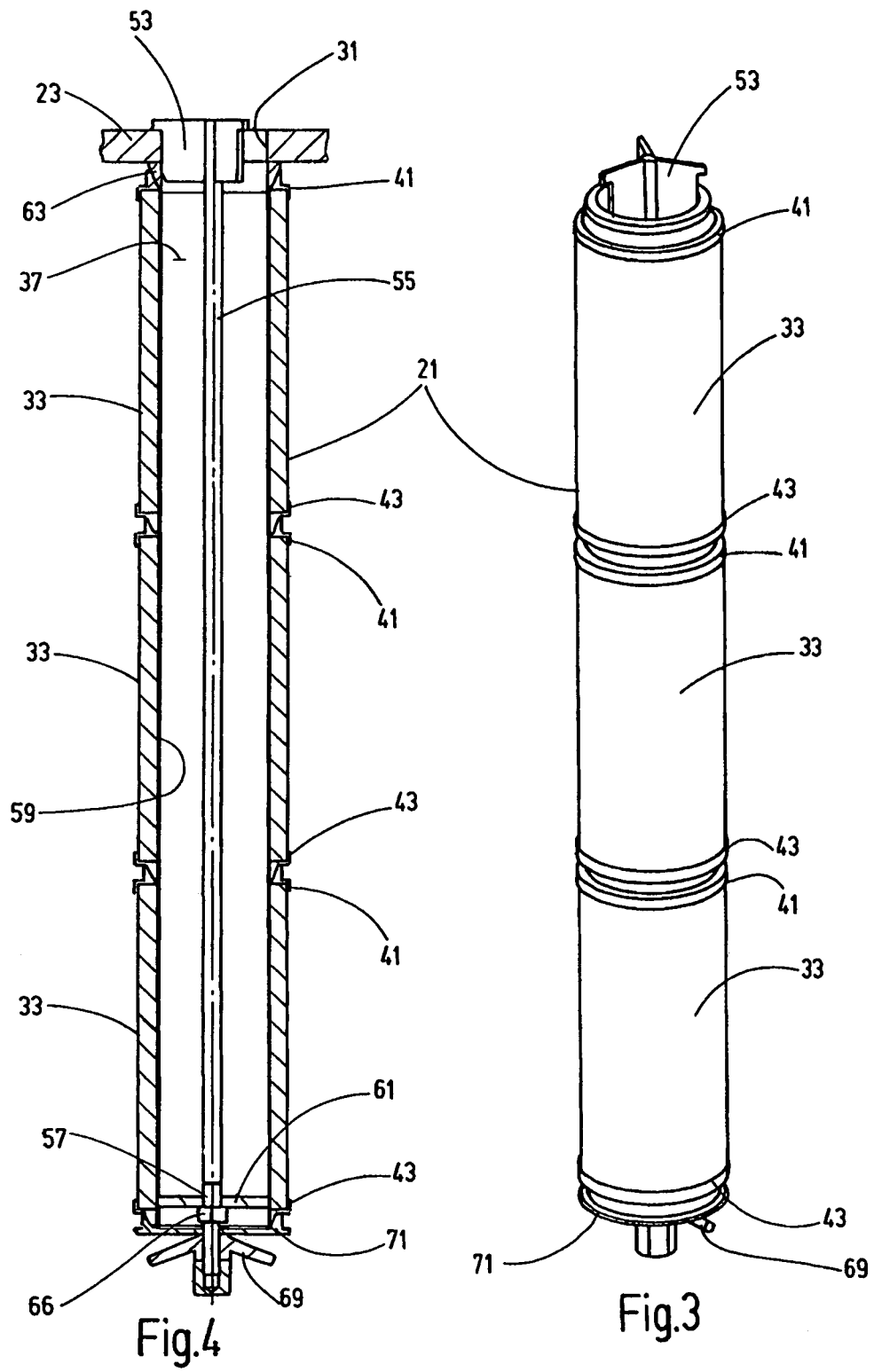

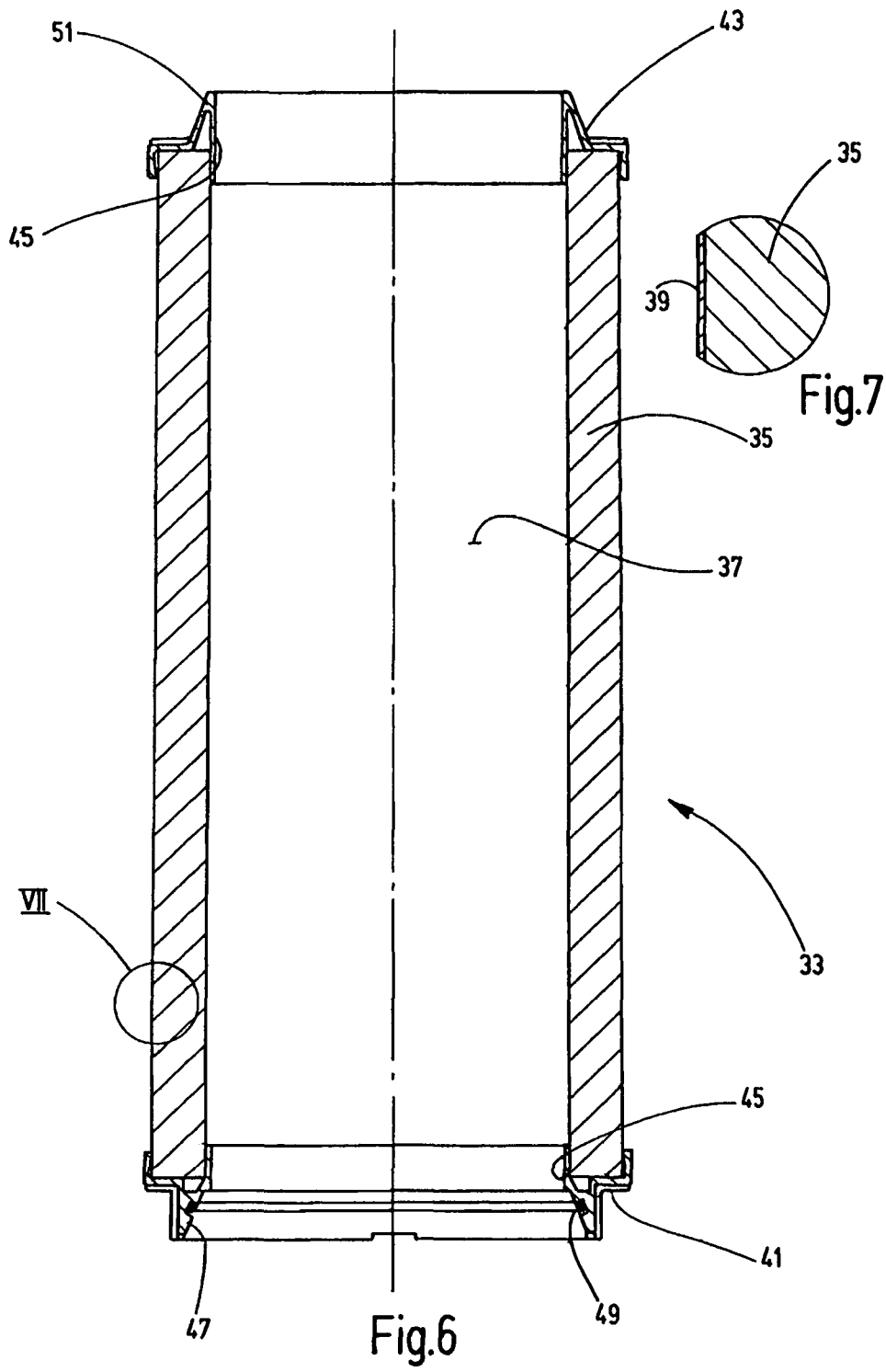

FILTER DEVICE FOR FLUIDS

FIELD OF THE INVENTION

The invention relates to a filter device for fluids, in particular for low viscosity fluids such as water, comprising a filter housing in which element holders are provided for a plurality of filter elements. The filter medium of the filter elements in the filter housing separates an unfiltered side from a clean side. The filter housing can be opened for the purpose of inserting and removing the filter elements. Furthermore, the invention relates to a filter cartridge for use in that filter device as well as to a filter element as a component of that filter cartridge.

BACKGROUND OF THE INVENTION

Filter devices of the aforementioned type are state of the art and are used in a variety of fields. A few examples that can be mentioned from the vast number of possible applications include the applications for water treatment, potable water filtration, the production of pure water and ultrapure water, the filtration of cooling lubricants and washing fluids, etc. With respect to the state of the art, reference is made to the line filter marketed by Hydac Process Technology GmbH of Neunkirchen, Germany, under the product name PLF1 and embodies a filter device of the type described in the foregoing.

When such line filters are to be used for applications in which a fine filtration of large volumetric flow rates is necessary and a correspondingly large filter surface area, for example, exceeding 500 m$^2$, has to be provided, problems arise both with respect to the design of the filter housing and with respect to carrying out the replacement procedures for replacing the used filter elements. In the case of filter surface areas exceeding 500 m$^2$ using filter elements in the form of conventional filter cartridges having a diameter of 67 mm and a length of 40 inches, dimensions that correspond to a filter surface area of about 1 m$^2$, the filter housing must provide more than 500 element holders as installation slots for the filter elements. The result is housing dimensions that are difficult to service, in particular, with respect to replacing the elements. Therefore, the state of the art provides such filter surface areas only by a plurality of filter housings.

SUMMARY OF THE INVENTION

An object of the present invention is to provide an improved filter device conforming to the genre under consideration that provides a filter surface area inside a filter housing that is considerably larger than that of the conventional filter devices, but nevertheless is characterized by its extreme ease of maintenance with respect to the replacement of the used filter elements.

The invention basically achieves this object by providing a filter device having a carrier in the form of a basket provided for the filter elements. The basket can be inserted into and removed from the filter housing. The filter elements can be releasably secured at the basket. Since a basket holding the filter elements is provided as a replaceable insert of the filter housing, a large number of filter elements can be removed jointly from the housing and inserted into the housing. This arrangement makes the maintenance work associated with the replacement of the elements much simpler, even if the basket has a large number of filter elements to achieve large filter surface areas. Since this large number of filter elements significantly increases the weight of the basket, the basket can be lifted out of the housing, for example, by attaching a lifting tool and then moving the basket into a position outside the housing, in which the basket can be easily and conveniently equipped with new elements. The resulting ease of maintenance also permits the filter device to be used even under challenging conditions, such as on drilling platforms in offshore oil fields. If, during the operation of the respective oil fields a pressure increase is necessary, treated sea water is pumped from a corresponding drilling platform into the oil field. In such applications the filter device provided for treating the sea water is designed for a filter surface area exceeding 500 m$^2$ at a filter fineness of 5μ. Due to the arrangement of the filter elements in a basket, which basket can be removed from the filter housing, these requirements can be met with a single filter housing. In addition, the replacement of the filter elements can be carried out easily and reliably, after the basket has been removed by a lifting means, on board the platform even under harsh environmental conditions.

In advantageous exemplary embodiments, the basket has a support plate, which support plate in the installation position in the housing separates the unfiltered side from the clean side and has fluid flow passages for forming the element holders. In this context, the filter elements can be releasably secured at the fluid flow passages such that the fluid flow passages are connected to the inner filter cavity surrounded by the filter medium.

In this respect, the arrangement can be configured with a distinct advantage where the filter housing has a circularly cylindrical section that receives the basket and exhibits an opening that can be closed by a removable cover. In this case, the basket can be inserted and removed through the opening. The support plate is circularly round and circumferentially sealed off at the housing wall in the installation position.

If an abutment ring projecting from the inner wall is provided for supporting the support plate of the basket in the filter housing, the procedure for replacing the filter can be carried out in a very simple and convenient way. All one has to do to remove the basket is to lift the basket off of the abutment ring. To re-install the basket, one need only place the basket down on the abutment ring without additional installation steps being necessary.

To secure the basket in the functional position during a filtering operation, the interior of the cover can have at least one axially projecting hold-down device. To hold the support plate of the basket on the abutment ring, this hold-down device extends through a clean-side outflow space, in which a housing outlet for the cleaned fluid is located.

The arrangement can be configured with a distinct advantage such that the element holders for securing the filter elements in the form of filter cartridges comprise a connecting device. The connecting device secures a fluid permeable support cylinder at the respective fluid flow passage of the support plate such that an assigned filter cartridge can be pushed onto the exterior of the support cylinder and pulled off from the same. Owing to such support cylinder, even filter cartridges exhibiting a longer length and correspondingly large filter surface area can be held securely in position. At the same time, the replacement steps can be performed easily and conveniently by stripping them off the associated support cylinder.

The subject matter of the invention is also a filter cartridge for use in a filter device, with the filter cartridge having preferably at least two filter elements. The filter elements are designed as identical parts and have a filter medium surrounding an inner filter cavity. The respective end of the filter medium is enclosed by an end cap, which end cap leaves open the access to the inner filter cavity. The respective filter elements are arranged coaxially to each other and are sealingly connected to each other at the end caps that interact with each other. If in this case there are, for example, three filter elements and each one of these filter elements exhibits a filter surface area of about 5 m², each filter cartridge has a filter surface area of about 15 m². A requisite total filter surface area of more than 500 m² can then be provided with 36 filter cartridges. When arranged in a removable basket, even that large number of filter cartridges can be housed in a single filter housing in such a way that they are easy to service.

Furthermore, the subject matter of the invention is also a filter element, which is a component of a filter cartridge, forming sealed connections between a plurality of filter elements. The sealed connections are formed by identical parts and are arranged coaxially to each other. The tilter element has an end cap of a first type and a complementary end cap of a second type. With a design of the end caps, the individual elements can be easily stacked to form a filter cartridge composed of a plurality of elements.

Preferably, at least the end cap of one type has a sealing element for forming a seal with the end cap of the respective other type of the adjacent additional filter element. The seal is formed when the end caps lie next to each other.

At the same time, the end cap of the first type has in an especially advantageous way a funnel at its opening. The funnel forms the access to the filter cavity, with this funnel expanding conically outward the opening of the end cap. The end cap of the second type has an axially projecting annular body surrounding the opening, with this annular body forming an outer cone for a fitting engagement with the funnel of the end cap of the first type.

To form a seal between the adjacent elements, an O-ring can be arranged on the inside of the funnel of the end cap of the first type to form an axial and radial seal that is easy to disassemble.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure:

FIG. 3 is a perspective view of a filter cartridge of the filter device of FIG. 1;

FIG. 4 is a side elevational view in section of the filter cartridge of FIG. 3;

FIG. 6 is a side elevational view in section, drawn to an even larger scale, of a single filter element of the filter cartridge of FIGS. 3 to 5; and FIG. 7 is an enlarged, partial side elevational view in section of a detail of the region VII in FIG. 6.

DETAILED DESCRIPTION OF THE INVENTION

The invention is explained below with reference to the drawings showing a line filter as an example that can be used with a distinct advantage for fine filtering of sea water. The sea water can be conveyed from a drilling platform of an offshore oil field into this oil field to increase the pressure where high volumetric flow rates are to be filtered at a filter fineness of 5μ with filter surface areas in the range of 500 m².

Figure 1:
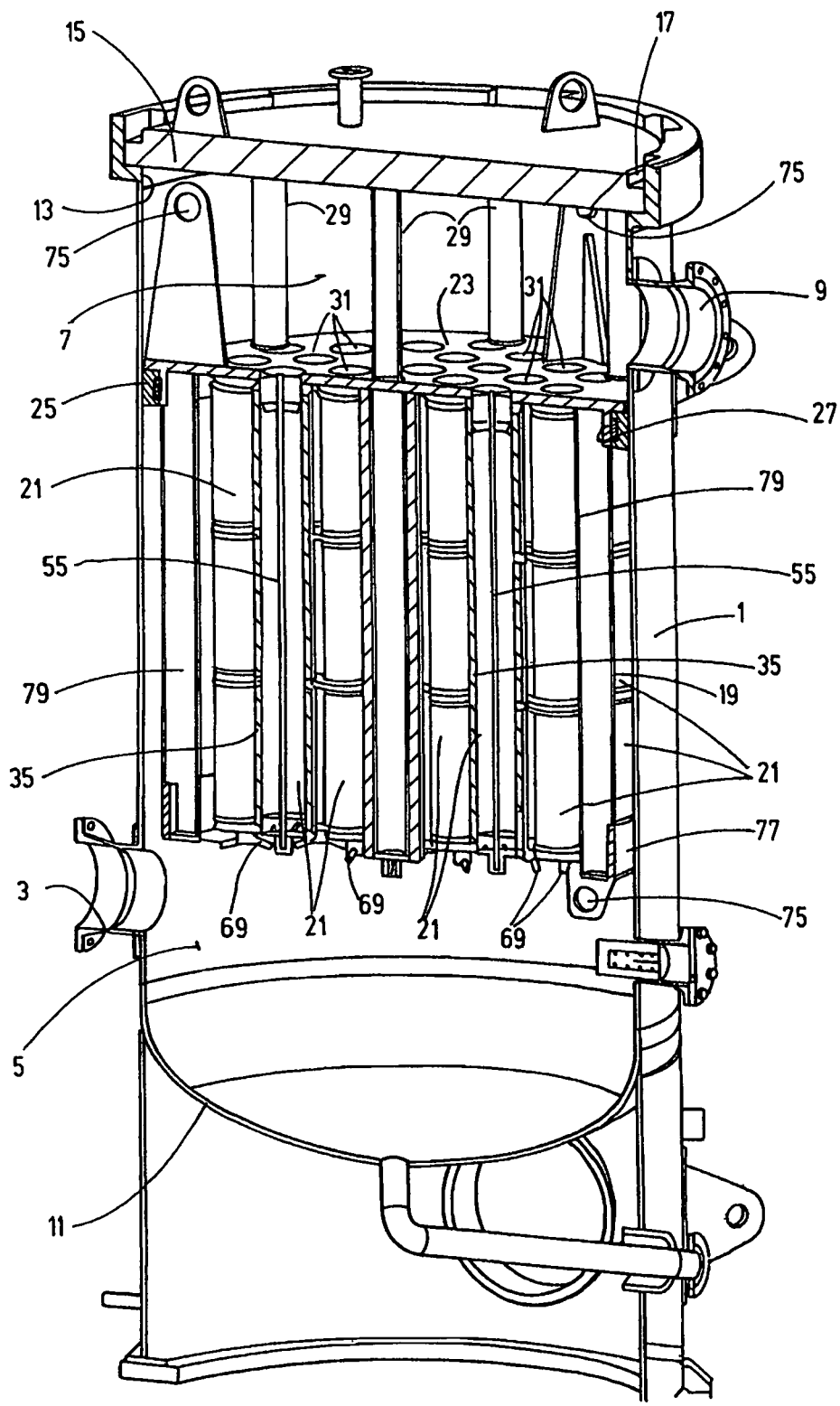
FIG. 1 is a perspective view in section of a filter device according to one exemplary embodiment of the invention.

FIG. 1 shows a filter housing 1 with a fluid inlet 3 for the inflow of sea water to an unfiltered space 5 of the housing 1. The outflow or filtered space 7 on the clean side has an outlet 9 on the housing 1. The housing 1 has a circular cylindrical shape, aside from a curved, closed bottom part 11, and has an upper opening 13 that can be closed with a removable cover 15. The cover 15 can be rotated and removably secured at the housing 1 by a bayonet lock 17.

Between the inflow space 5 on the unfiltered side and the outflow space 7 on the clean side, the filter arrangement is provided including a basket 19 as a carrier for a number of filter cartridges 21 (not all numbered in the drawing). The basket 19, shown alone in FIG. 2, can be inserted through the opening 13 into the housing 1 and removed from the housing. As the carrier element for the filter cartridges 21, the basket 19 has a circularly round support plate 23 resting against an abutment ring 25 that projects at the interior of the housing 1. When the basket 19 in its functional position is inserted into the housing 1, a collar 27 of the support plate 23 is sealed off at the abutment ring 25. The support plate 23 separates the inflow space 5 on the unfiltered side from the outflow space 7 on the clean side in the housing 1. To hold the basket 19 in engagement with the abutment ring 25, the cover 15 has a plurality of rod shaped hold-down devices 29. Devices 29 extend from the cover 15 axially through the outflow space 7 to the support plate 23.

Support plate 23 has a fluid flow passage 31 for each filter cartridge 21, of these fluid flow passages only some of them being numbered in FIG. 1 for the sake of a better overview. In the example shown in the drawing, 36 fluid flow passages 31 are provided to match the 36 filter cartridges 21. At each fluid flow passage 31, an element holder is provided to secure releasably the respective filter cartridge 21. This feature is shown in greater detail in FIGS. 3 to 7.

Figure 5:
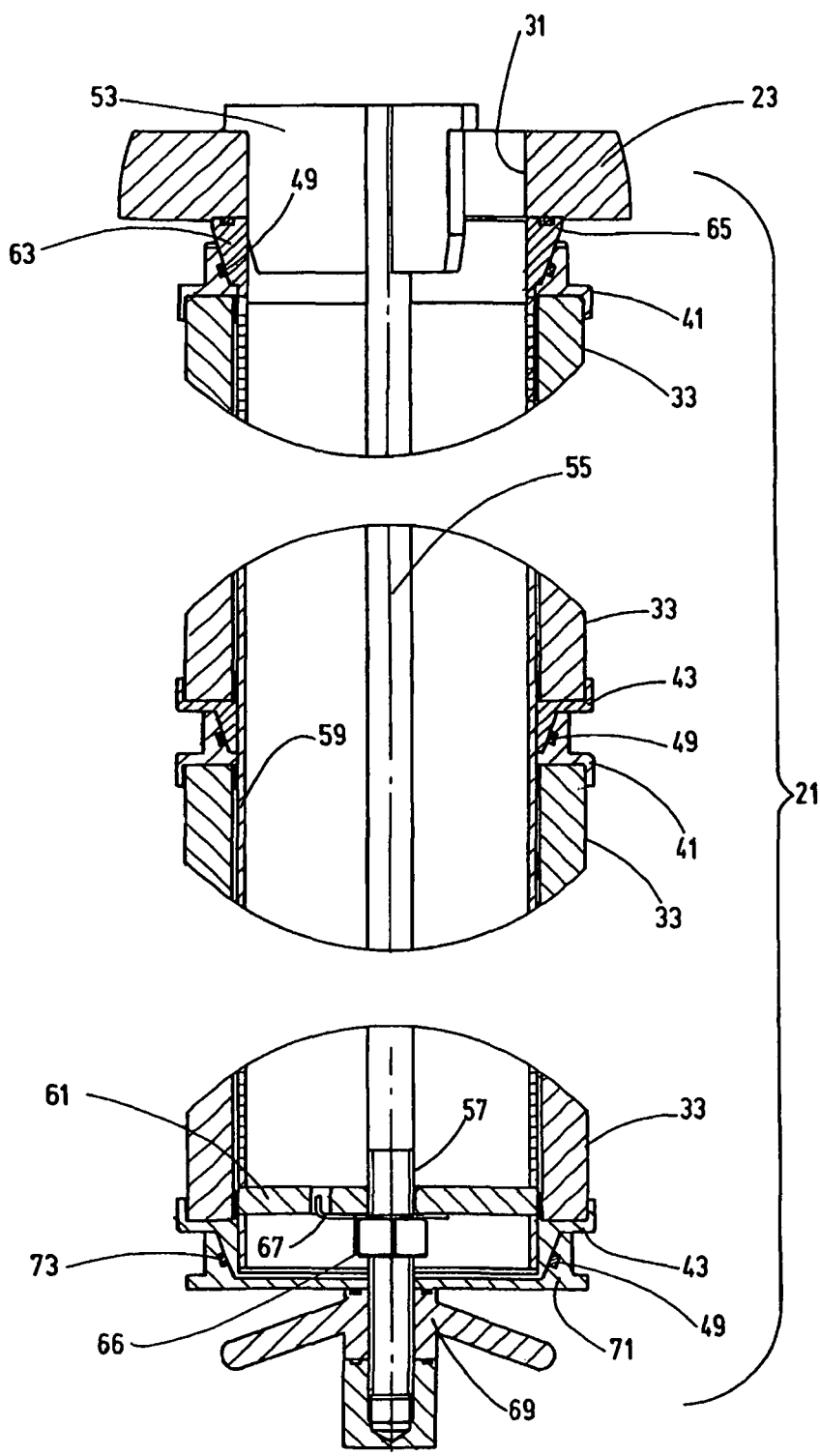
FIG. 5 is a side elevational view in section of the filter cartridge of FIG. 4 shown with breaks and drawn to a larger scale than in FIGS. 3 and 4.

The filter cartridges 21, shown alone in FIGS. 3 to 5, are constructed in each instance from three stacked filter elements 33 formed of identical parts. One of these filter elements is shown alone in FIG. 6. These filter elements have a filter medium 35 conventionally surrounding an inner filter cavity 37 in the form of a hollow cylinder, for example, in conformity with the line filter PLF1, marketed by the applicant. This filter medium provides a large pleated filter surface area. Such filter media can contain a polyester material and/or polypropylene and can be multi-layered. In the present case, the filter medium 35 is surrounded by a support fabric 39 (see FIG. 7). Similarly, in this case a mesh pack can be provided. On each end side, the filter medium 35 is enclosed by a respective end cap 41 or 43 made of polyamide in the present example. The resulting filter element 33 can be totally ashed as a disposable element. Such a filter element can provide a filter surface area of about 5 m², so that a filter cartridge 21 with three filter elements 33 provides about 15 m² of filter surface area. If, for an application for increasing the pressure of sea water, a total filter surface area of about 500 m² is necessary, then this requirement can be met by providing 36 slots for the filter cartridges 21 in the basket 19 of the filter housing 1, as shown in the illustrated example.

For easy stacking of the filter elements 33, the end caps of each filter element are designed differently for each end. One end cap 41 of the first type has a shape that is complementary to an end cap 43 of the second type. More specifically, the end cap 41 of the first type has an axially projecting funnel 47 expanded conically outward and surrounding the cap opening

45. An O-ring 49 may be found on the inside of said funnel. The end cap 43 of the second type has an axially projecting annular body 51 connected to the opening 45. This annular body 51 forms an outer cone for a fitting engagement with the funnel 47 of the end cap 41 of the first type. When the individual elements 33 are easily assembled to form the filter cartridge 21, an axial/radial seal is formed in each instance between the respective end caps 41, 43.

The filter cartridges 21 can be releasably secured at the fluid flow passages 31 of the support plate 23 of the basket 19 by a connecting device having a star-shaped retaining body 53 extending over the top side of the support plate 23 (see FIG. 4). One end of a connecting rod 55 is secured to retaining body 53. The connecting rod 55 extends in the axial direction as far as beyond the lower end of a filter cartridge 21 that is to be secured; see, in particular, FIG. 4. In the region of the corresponding end, the connecting rod 55 is provided with an outer thread 57. As very clear from FIG. 5, the connecting rod 55 is used to secure a fluid permeable support cylinder 59 that forms a displaceable mounting for a filter cartridge 21 that is pushed on, at the support plate 23 of the basket 19. For this purpose, a holding disk 61 is screwed with a nut 66 on the thread 57 of the connecting rod 55 such that the holding disk 61 clamps the support cylinder 59 against a conical ring 63 and thereby against the support plate 23. The conical ring 63 is sealed off at the support plate 23 by an O-ring 65 and engages with the funnel 47 of the adjacent end cap 41. The tightening nut 67 for the holding disk 61 is secured against loosening at the holding disk by a sheet metal lock 67.

To hold the respective filter cartridges 21 in position on the support cylinder 59 such that the elements 33 are sealed off from each other at the end caps 41, 43 and such that the end cap 41 of the uppermost element 33 is in sealed fluid connection with the fluid flow passage 31 of the support plate 23 by the conical ring 63, the free end of the connecting rod 55 has a wing nut 69 on the thread 57. With this wing nut, a locking body 71 can be releasably pressed against the end cap 43 of the bottommost element 33. As a result, the end cap 41 of the uppermost element 33 is held against the conical ring 63 and is sealed off thereat by the O-ring 49. The locking body 71 in turn is sealed off at the assigned end cap 43 by an O-ring 73. As a result, the clean-side filter cavity 37 connected to the outflow space 7 by the fluid flow passage 31 is connected to the inflow space 5 on the unfiltered side only by way of the filter medium of the filter cartridges 21, but is otherwise sealed off.

Figure 2:
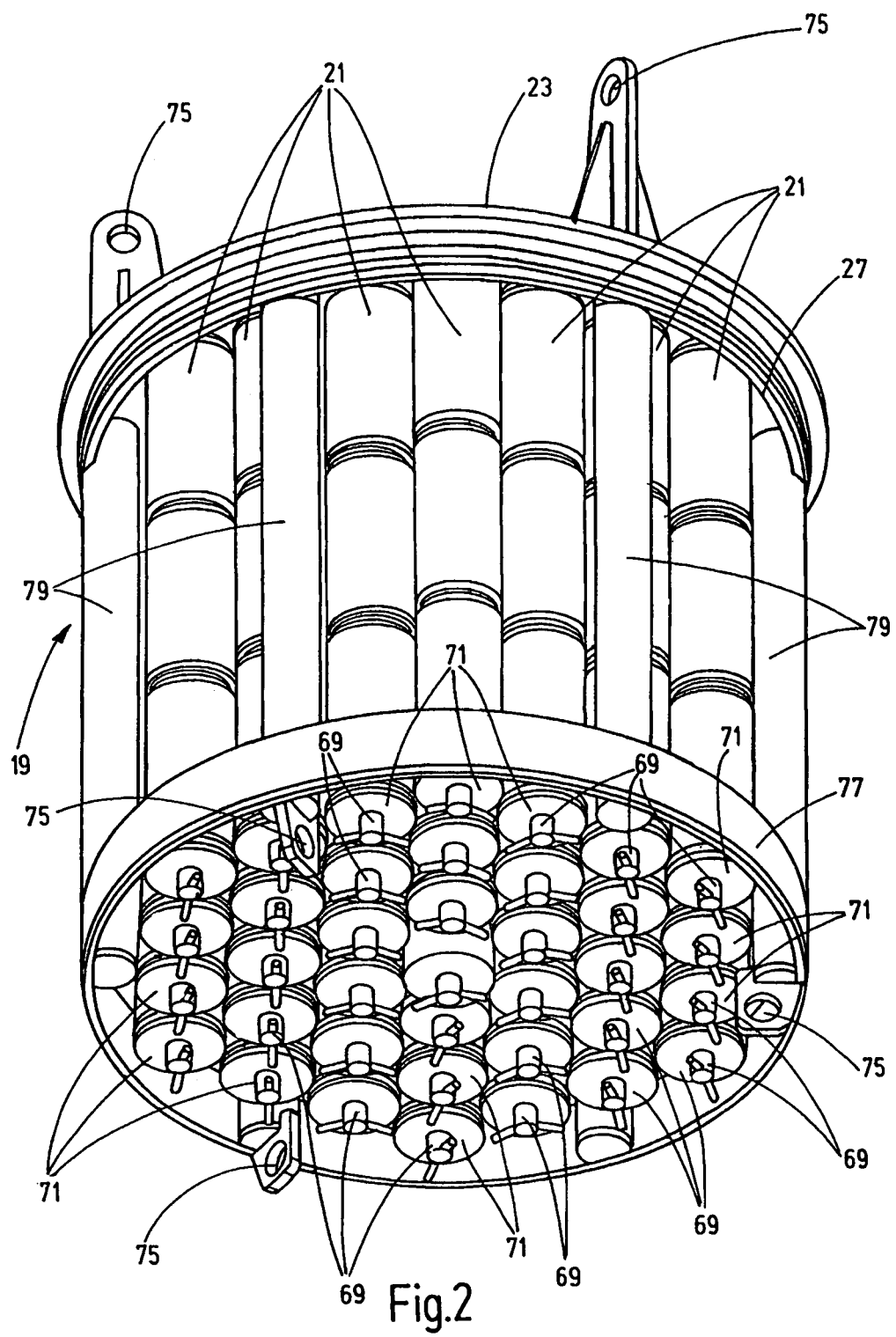
FIG. 2 is a perspective view of the basket of the filter device of FIG. 1, with this basket provided as the carrier for filter cartridges being drawn to a larger scale than in FIG. 1.

For the purpose of a replacement operation, the basket 19 with the used filter cartridges 21 is lifted out of the housing 1, for example, by attaching a lifting device at the lifting eye 75, and is set down in a position in which the bottom side of the basket 19 is freely accessible, as shown in FIG. 2. The holding disk 71 can then be removed by loosening the wing nuts 69, with only some of the wing nuts being numbered in the drawing. The used filter cartridges 21 are released and can be pulled off from the support cylinder 59. After the new filter cartridges 21 are pushed on and fastened with tightening screws of the holding disks 71, the re-equipped basket 19 is ready again for insertion into the housing 1. FIGS. 1 and 2 show that the basket 19 has an enclosing ring 77. Concentrically to the collar 27 of the support plate 23, enclosing ring 77 surrounds the group of filter cartridges 21 at their bottom, free ends and is connected to the collar 27 by struts 79. Struts 79 are welded to the collar 27 and the ring 77. Lifting eyes 75 for handling the basket 19 are likewise attached by welding.

While one embodiment has been chosen to illustrate the invention, it will be understood by those skilled in the art that various changes and modifications can be made therein without departing from the scope of the invention as defined in the appended claims.

What is claimed is:

1. A filter device for fluids, comprising:
a filter housing that can be opened and closed and that has an unfiltered space and a filtered space inside said filter housing;
a carrier formed by a basket insertable into and removable from said filter housing;
a plurality of filter cartridges releasably secured to said basket, each said filter cartridge having a plurality of identical filter elements, each said filter element having a filter medium separating an unfiltered side from a filtered side thereof and surrounding an inner filter cavity, said filter elements of each said filter cartridge being coaxially arranged relative to one another; and
first and second end caps enclosing opposite ends of each said filter medium, each said end cap having an opening providing access to the respective inner cavity, adjacent ones of said end caps of said filter elements of each said filter cartridge engaging and being sealed to one another, said first and second end caps being complementary, each said first end cap having a funnel at said opening thereof, each said funnel expanding conically in an axially outward direction about said opening thereof, each said second end cap having an axially projecting annular body surrounding said opening thereof and forming an outer conical surface engaging said funnel of an adjacent one of said first end caps.

2. A filter device according to claim 1, wherein
said basket comprises a support plate separating said unfiltered space from said filtered space installed in said filter housing, said support plate having fluid flow passages having element holders for said filter cartridges, said filter cartridges being releasably secured at said fluid flow passages with said fluid flow passages being connected with the respective inner cavities.

3. A filter device according to claim 2 wherein
said filter housing comprises a circularly cylindrical section receiving said basket and has a housing opening releasably closed by a removable cover, said basket being insertable into and removable from said filter housing through said housing opening, said support plate being circularly round and being sealed to a housing wall of said filter housing in an installed position of said support plate.

4. A filter device according to claim 3 wherein
an abutment ring projects radially inwardly from an inner surface of said housing wall and supports said support plate in said filter housing.

5. A filter device according to claim 4 wherein
said cover has at least one hold-down device projecting axially from an inner surface of said cover into said filter housing through said filtered space to engage said support plate and to hold said support plate against said abutment ring; and
said filter housing comprises a housing outlet connected to said filtered space.

6. A filter device according to claim 2 wherein
said element holders comprise connecting devices securing fluid permeable support cylinders at said fluid flow passages, said filter cartridges being pushable onto and pullable off exterior surfaces of said support cylinders.

7. A filter device according to claim 6 wherein
said connecting devices comprise connecting rods anchored to and located at said fluid flow passages, said connecting rods extending through said support cylinders and having thread joints at free ends of said connecting rods securing holding disks thereon, said holding disks extending over end edges of said support cylinders and pressing said support cylinders against said support plate.

8. A filter device according to claim 7 wherein said filter cartridges are releasably securable to said support plate by locking bodies closing said filter cavities at first ends of said filter cavities remote from said support plate in functional positions of said filter cartridges, second ends of said filter cavities opposite said first ends thereof being open and being in sealed fluid connections with said fluid flow passages in said support plate in the functional positions.

9. A filter device according to claim 8 wherein said locking bodies are releasably secured to said connecting rods by said threaded joints.

10. A filter device according to claim 1 wherein said first end caps having sealing elements forming seals with the respective second end caps of the adjacent ones of said filter elements.

11. A filter device according to claim 1 wherein an O-ring is on an inside of each said funnel.

\* \* \* \* \*